(12) United States Patent
Ueno et al.

(10) Patent No.: US 11,195,081 B2
(45) Date of Patent: Dec. 7, 2021

(54) DIAGNOSTIC DEVICE USING BOTH A PHYSICAL MODEL AND MATHEMATICAL MODEL FOR ANOMALY DETECTION

(71) Applicant: Okuma Corporation, Niwa-Gun (JP)

(72) Inventors: Hiroshi Ueno, Niwa-Gun (JP);
Tomoharu Ando, Niwa-Gun (JP);
Takashi Norihisa, Niwa-Gun (JP);
Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 1022 days.

(21) Appl. No.: 15/848,335

(22) Filed: Dec. 20, 2017

(65) Prior Publication Data
US 2018/0218255 A1 Aug. 2, 2018

(30) Foreign Application Priority Data
Jan. 27, 2017 (JP) .............................. JP2017-013485

(51) Int. Cl.
*G06N 3/04* (2006.01)
*G06N 5/04* (2006.01)
(Continued)

(52) U.S. Cl.
CPC ......... *G06N 3/0436* (2013.01); *G05B 23/024* (2013.01); *G06N 3/08* (2013.01); *G06N 5/04* (2013.01)

(58) Field of Classification Search
None
See application file for complete search history.

(56) References Cited

U.S. PATENT DOCUMENTS 7,330,804 B2 * 2/2008 Turner ................ G05B 13/027
700/29
2005/0114081 A1 5/2005 Fukui
(Continued)

FOREIGN PATENT DOCUMENTS

| JP | H08-202444 A1 | 8/1996 |
| JP | 3340541 B2 | 11/2002 |
| JP | 2005-121639 A1 | 5/2005 |

OTHER PUBLICATIONS

Japanese Office Action (Application No. 2017-013485) dated Aug. 18, 2020 (with English translation).

*Primary Examiner* — Alan Chen
(74) *Attorney, Agent, or Firm* — Burr & Brown, PLLC

(57) ABSTRACT

A diagnostic device diagnoses a state of a test object. The diagnostic device includes a physical model base diagnosis unit, a mathematical model base diagnosis unit, a model update necessity determination unit, and an update notification unit. The physical model base diagnosis unit is configured to perform the diagnosis using a feature quantity. The mathematical model base diagnosis unit is configured to perform the diagnosis using a machine learning model. The model update necessity determination unit is configured such that if diagnostic results by the physical model base diagnosis unit and the mathematical model base diagnosis unit differ, the model update necessity determination unit determines that at least one of a physical model or a mathematical model is necessary to be updated. The update notification unit is configured such that if the model update necessity determination unit determines that the update is necessary, the update notification unit notifies it.

7 Claims, 5 Drawing Sheets

(51) Int. Cl.
*G05B 23/02* (2006.01)
*G06N 3/08* (2006.01)

(56) References Cited

U.S. PATENT DOCUMENTS

| | | | |
|---|---|---|---|
| 2010/0100248 A1* | 4/2010 | Minto | G05B 17/02 |
| | | | 700/287 |
| 2012/0185728 A1* | 7/2012 | Guo | G06N 20/00 |
| | | | 714/26 |
| 2015/0339263 A1* | 11/2015 | Abu El Ata | G06Q 10/06 |
| | | | 703/2 |
| 2018/0299862 A1* | 10/2018 | Zhao | G05B 23/0281 |
| 2019/0146478 A1* | 5/2019 | Celia | G05B 19/41845 |
| | | | 702/188 |

* cited by examiner

DIAGNOSTIC DEVICE USING BOTH A PHYSICAL MODEL AND MATHEMATICAL MODEL FOR ANOMALY DETECTION

BACKGROUND

This application claims the benefit of Japanese Patent Application Number 2017-013485 filed on Jan. 27, 2017, the entirety of which is incorporated by reference.

TECHNICAL FIELD

The disclosure relates to a diagnostic device that diagnoses whether a test object such as a machine tool is normal or abnormal based on preliminary incorporated diagnostic models.

RELATED ART

A state diagnosis for facilities is considerably important in operations of various facilities. The continuous use of the facility unaware of the abnormality possibly results in a major damage of the facility and a human damage. Therefore, early detection of the abnormality is required.

Many techniques have been proposed for the abnormality diagnosis of facilities. For example, Japanese Patent No. 3340541 proposes a technique that performs the Fourier transform on a vibration detection signal of a test object for comparison with a preset threshold, obtains a certainty factor (an extent considered as normal or abnormal) of abnormality using a neural network, and performs a fuzzy operation on both for abnormality determination.

Like this technique, there has been proposed the technique that performs the abnormality determination using the preset condition or the model that has preliminary learned. However, for example, with a machine tool, influencing factors such as specifications, installation environments, process targets, cutting tools, and process conditions for each user become considerably massive. Accordingly, it is realistically impossible to set the threshold and cause the neural network to learn assuming every possibly patterns before the shipment, and therefore it is required to appropriately update a determination method. In such a case, a large importance lies in which timing the model should be updated and what should be done to efficiently establish a high-accurate model. Updating the model at an unnecessary timing results in deterioration in accuracy due to an excessive consumption of calculation resources and deterioration of balance of learning data, and neglecting the update fails to handle a new abnormality.

Furthermore, how the required data is selected for the model update is also important, and therefore efficiently selecting and holding information required to improve the diagnosis accuracy under a restriction on a capacity of a storage device is required.

Therefore, an object of the disclosure is to provide a diagnostic device that determines timing appropriate for update of a diagnostic model by the device itself to always preferably maintain diagnosis performance and to appropriately hold information required to improve performance of the model.

SUMMARY

In order to achieve the above-described object, there is provided a diagnostic device according to a first aspect of the disclosure that diagnoses a state of a test object. The diagnostic device includes a physical model base diagnosis unit, a mathematical model base diagnosis unit, a model update necessity determination unit, and an update notification unit. The physical model base diagnosis unit is configured to perform the diagnosis using a feature quantity. The feature quantity is predicted to be generated when an abnormality occurs in the test object based on a physical characteristic of the test object. The mathematical model base diagnosis unit is configured to perform the diagnosis using a machine learning model. The machine learning model has learnt based on a signal while the test object is normal and/or abnormal. The model update necessity determination unit is configured such that if diagnostic results by the physical model base diagnosis unit and the mathematical model base diagnosis unit differ, the model update necessity determination unit determines that at least one of a physical model or a mathematical model is necessary to be updated. The update notification unit is configured such that if the model update necessity determination unit determines that the update is necessary, the update notification unit notifies that the update is necessary.

In the diagnostic device according to a second aspect of the embodiment, which is in the first aspect of the embodiment, the physical model base diagnosis unit may include diagnostic information acquisition means configured to acquire information for the state diagnosis from the test object and physical model storage means that stores the physical model. The physical model may be configured to calculate the feature quantity based on the physical characteristic of the test object. The feature quantity may be generated in diagnostic information acquired by the diagnostic information acquisition means when the abnormality occurs.

In the diagnostic device according to a third aspect of the embodiment, which is in the first aspect of the embodiment, the mathematical model base diagnosis unit may include diagnostic information acquisition means configured to acquire information for the state diagnosis from the test object and mathematical model storage means that stores the mathematical model obtained through the machine learning based on the diagnostic information. The diagnostic information may be acquired by the diagnostic information acquisition means while the test object is normal and/or abnormal.

The diagnostic device according to a fourth aspect of the embodiment, which is in the first aspect of the embodiment, may further include a model update condition setting unit configured to set which state of normal or abnormal of the diagnostic result of the test object necessitates the update of the model. The model update necessity determination unit may be configured to determine that a model, where a diagnostic result of the state of the test object matches a condition set to the model update condition setting unit, needs to be updated.

The diagnostic device according to a fifth aspect of the embodiment, which is in the first aspect of the embodiment, may further include a diagnostic information storage unit configured such that if the model update necessity determination unit determines that the update is necessary, the diagnostic information storage unit stores information required for the diagnosis with the physical model and/or the mathematical model.

In the diagnostic device according to a sixth aspect of the embodiment, which is in the fifth aspect of the embodiment, as the machine learning model, a neural network may be used. The diagnostic information storage unit may be configured to classify and store the information required for the diagnosis with the physical model based on an output distribution of respective neurons constituting the neural network.

In the diagnostic device according to a seventh aspect of the embodiment, which is in the first aspect of the embodiment, the update notification unit may be configured to display necessity of the update of the model in a screen. The update notification unit may be configured to display a level of a degree of necessity of the update together.

With the embodiment, for example, the device itself can measure the update timing appropriate for the diagnostic model, the diagnostic device can internally perform the learning again automatically, and the necessity of the update of the model can be notified to the manufacturer. Therefore, preferred diagnostic ability can always be maintained. Especially, with the embodiments described in the fifth and the sixth aspects, in addition to the above-described effects, the information required to update the diagnostic model can be efficiently collected and held, thereby ensuring a reduction in an amount of memory and a volume of communications and improvement in the diagnosis performance.

With the embodiment described in the seventh aspect, in addition to the above-described effects, when the recommendation of the model update is displayed, the magnitude of the extent of the necessity of model update is also notified. Therefore, the information required for examination whether the update is actually performed or not and the schedule adjustment for the update work can be easily obtained.

BRIEF DESCRIPTION OF THE DRAWINGS

FIG. 2A illustrates a signal waveform during normal, FIG. 2B illustrates a signal waveform during abnormal in a physical model, and FIG. 2C illustrates a signal waveform during abnormal in a mathematical model.

DETAILED DESCRIPTION

The following describes embodiments of the disclosure with reference to the drawings.

Figure 1:
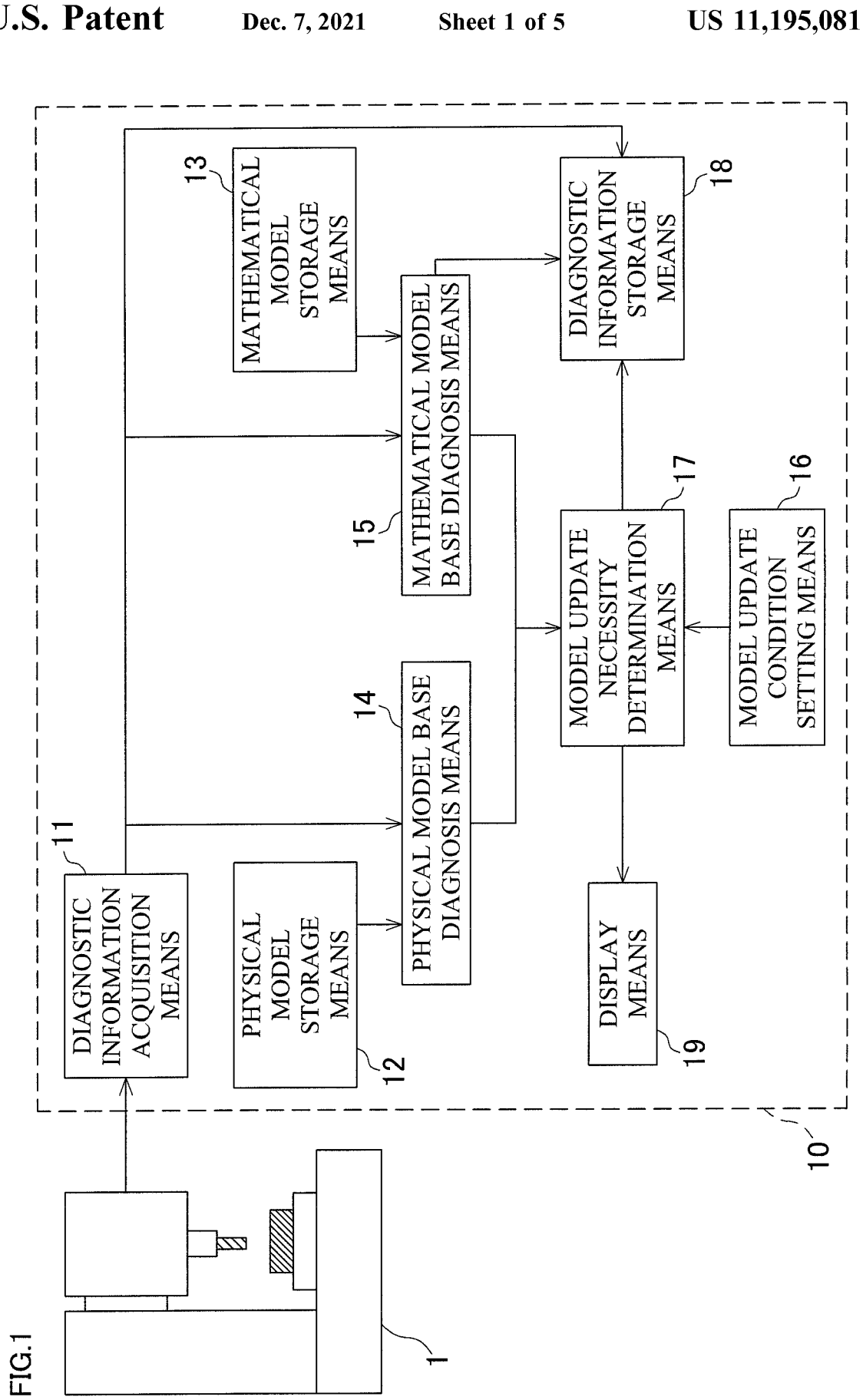
FIG. 1 is a block configuration diagram of a diagnostic device.

FIG. 1 is a block configuration diagram illustrating an example of a diagnostic device of the embodiment. Here, while a diagnostic device 10 is attached to a machine tool 1 as a test object, the diagnostic device 10 may be embedded in a control device (not illustrated) of the machine tool 1.

The diagnostic device 10 includes diagnostic information acquisition means 11 that acquires control information of the machine tool 1 and measurement signals from various sensors (not illustrated) as diagnostic information.

The diagnostic device 10 also includes physical model storage means 12 and mathematical model storage means 13. The physical model storage means 12 stores a physical model that calculates which characteristic appears in the diagnostic information when an abnormality occurs based on physical characteristics such as a specification value of a machine component and a machine structure. The mathematical model storage means 13 stores a mathematical model acquired through machine learning based on the diagnostic information while the machine tool 1 is normal and/or abnormal.

Furthermore, the diagnostic device 10 includes physical model base diagnosis means 14, mathematical model base diagnosis means 15, and model update necessity determination means 17. The physical model base diagnosis means 14 performs state diagnosis based on the physical model stored in the physical model storage means 12 and the diagnostic information acquired from the diagnostic information acquisition means 11. The mathematical model base diagnosis means 15 performs the state diagnosis based on the mathematical model stored in the mathematical model storage means 13 and the diagnostic information acquired from the diagnostic information acquisition means 11. The model update necessity determination means 17 determines the necessity of update of the physical model and/or the mathematical model based on diagnostic results by the physical model base diagnosis means 14 and the mathematical model base diagnosis means 15 and an update condition held by model update condition setting means 16.

The following describes a determination method by the physical model base diagnosis means 14 and the mathematical model base diagnosis means 15.

Figure 2A:
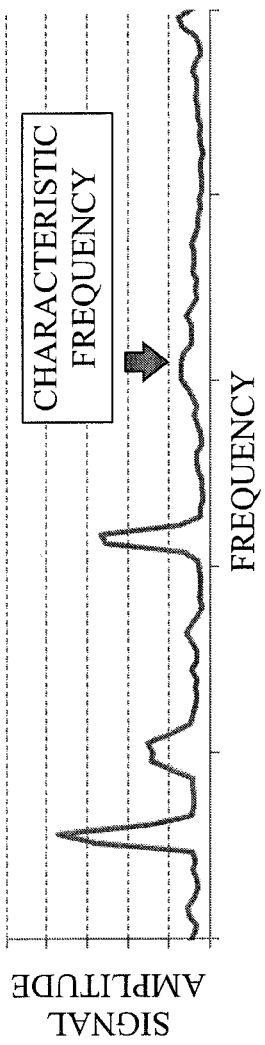
FIG. 2A to FIG. 2C are waveform diagrams illustrating diagnosis examples with characteristic frequencies.
Figure 2B:
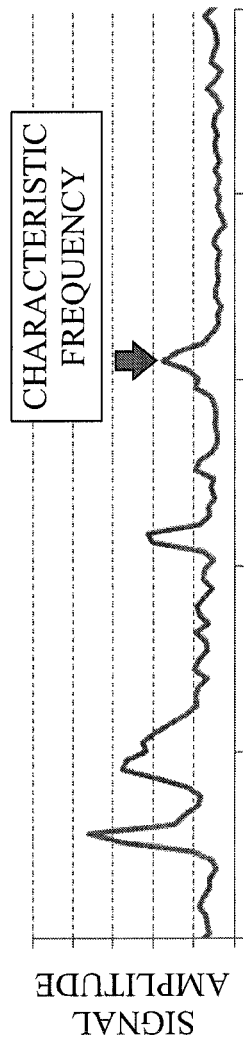
Figure 2C:
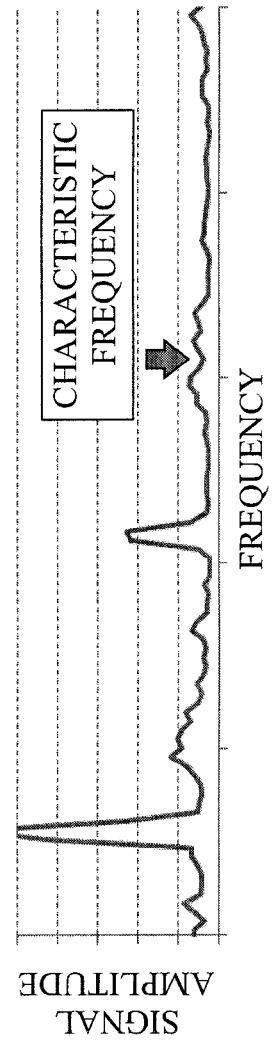

A support bearing damage of a ball screw is one example of an assumed abnormal mode in the abnormality diagnosis targeting a feed axis of a machine tool. For example, it has been known that, if the bearing has a flaw, a vibration at a specific frequency increases, and this frequency ("the characteristic frequency" in FIG. 2A to FIG. 2C) can be easily obtained from a bearing specification, a rotation speed of the ball screw, and a similar specification. The physical model base diagnosis means 14 performs the determination for abnormality based on the foregoing physical characteristics. In this case, although the determination logic is clear and the analysis is performed focusing on the known feature quantities and therefore the high-accurate detection is possible, this diagnosis can detect only the abnormal modes preliminary assumed by a technician.

Meanwhile, the mathematical model base diagnosis means 15, for example, establishes a model through learning from data using a machine learning technique such as a neural network and performs abnormality diagnosis. With this method, since the machine itself extracts the characteristics based on cases during abnormal, the method allows detecting an abnormal mode like FIG. 2C, which has no change in the characteristic frequency and is not preliminary assumed.

Using the property, a combination of the physical model with which the known abnormal modes can be highly accurately detected and the mathematical model with which the abnormality not handled by the physical model can be detected ensures not only the abnormal detection in a wider range but also an efficient growth of the diagnosis performance by using a mutual complementary relationship. Specifically, the learning by the mathematical model is advanced such that the mathematical model can highly accurately follow the cases diagnosed as "abnormal" with the physical model. Additionally, collecting and accumulating the cases diagnosed as "abnormal" by the mathematical model and feeding back the cases to the technician ensures the establishment of the physical model that can detect a variety of abnormalities further.

As means to achieve the technique, the following describes performance of the model update necessity determination means 17, diagnostic information storage means 18, and display means 19.

First, when the model update necessity determination means 17 determines that "update necessary," the diagnostic information storage means 18 stores the diagnostic information at the time. Then, the diagnostic information storage means 18 may also acquire mathematical model operation information indicative of an operation process of the mathematical model from the mathematical model base diagnosis means 15, classify the diagnostic information using this mathematical model operation information as a key, and store the diagnostic information.

The display means 19 displays the diagnostic results by the physical model base diagnosis means 14 and the mathematical model base diagnosis means 15 or the diagnostic result integrating both diagnostic results, and also displays an update necessity determination result by the model update necessity determination means 17.

Figure 3:
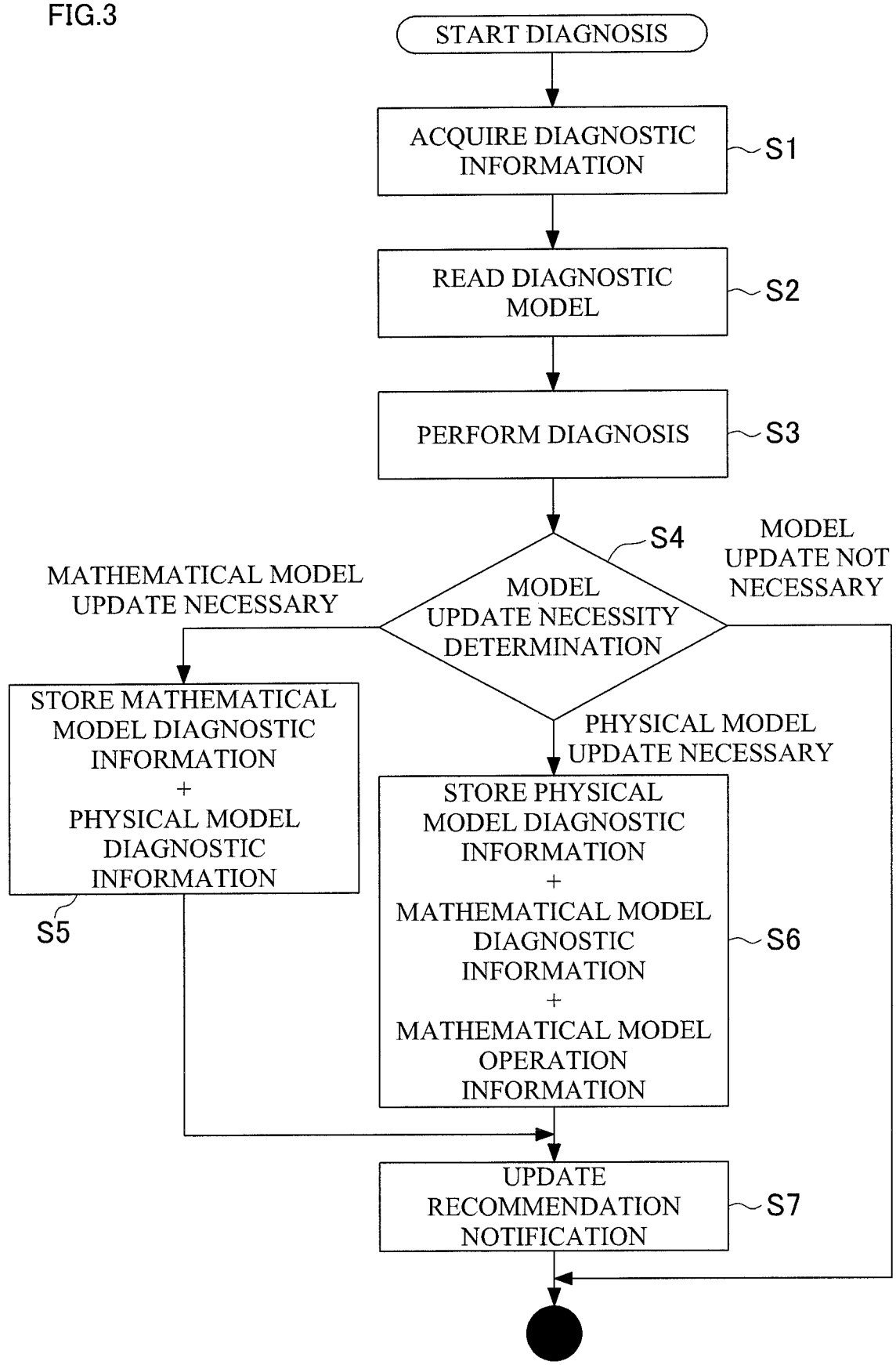
FIG. 3 is a flowchart for a diagnostic method.

The following describes details of the state diagnosis method by the diagnostic device 10 with reference to the flowchart in FIG. 3.

First, at S1, the diagnostic information acquisition means 11 acquires the information for state diagnosis (the diagnostic information) from the machine tool 1.

The information for diagnosis is, for example, a motor torque of the machine tool, an acceleration signal measured by a vibration sensor, specifications of the machine, and specification values of components.

Next, at S2, model data used for the physical model and the mathematical model diagnoses are acquired from the physical model storage means 12 and the mathematical model storage means 13. The model data of the physical model includes, for example, a calculation formula to calculate a feature quantity from a measurement signal. On the other hand, the model data of the mathematical model includes, for example, a structure and a weight of the neural network.

Next, at S3, the physical model base diagnosis means 14 performs the state diagnosis using the acquired physical model and the diagnostic information and the mathematical model base diagnosis means 15 performs the state diagnosis using the acquired mathematical model and the diagnostic information.

Subsequently, at S4, the model update necessity determination means 17 determines the necessity of update of the diagnostic models based on the diagnostic results of the physical model and the mathematical model by both diagnosis means and the update condition held by the model update condition setting means 16. Details of this determination method will be described later.

When it is determined as "model update not necessary" at S4, the display means 19 displays the diagnostic result at S3 and terminates the diagnosis. Meanwhile, when it is determined as "model update necessary," the information required for the model update is classified and accumulated (S5, S6).

Specifically, when it is determined as "mathematical model update necessary" at S4, the mathematical model diagnostic information input to the mathematical model and the physical model diagnostic information input to the physical model in the diagnosis at S3 are combined, and the diagnostic information storage means 18 stores the combined information (S5).

Meanwhile, when it is determined as "physical model update necessary" at S4, the diagnostic information storage means 18 stores the mathematical model diagnostic information input to the mathematical model and the operation information in the mathematical model relative to the input together, in addition to the physical model diagnostic information input to the physical model in the diagnosis at S3 (S6).

Furthermore, when it is determined as "physical model update necessary" or "mathematical model update necessary" at S4, the display means 19 displays the necessity of the model update (S7).

Next, the following describes details of model update necessity determination at S4.

As described above, for example, if the rotating component has the flaw, the feature quantity generated during abnormal can be predicted using machine structure information and the specifications of the components, such as an appearance of a peak at a specific frequency of the machine vibration. Based on such way of thinking, the physical model, for example, preliminary assumes the component in which the abnormality possibly occurs and the abnormal mode, calculates the corresponding feature quantity, and compares the feature quantity with a threshold to detect the abnormality. Meanwhile, in the diagnosis through the machine learning, the machine itself learns the characteristic appearing on the signal. Therefore, this configuration eliminates the need for a human to preliminary obtain the feature quantity. However, a large number of data during the machine abnormality (or while the machine is normal) is required for the learning.

Because of such relationship, when only the diagnosis with the physical model determines the state as "abnormal," there is a possibility that learning corresponding to the relevant abnormal mode is insufficient in the mathematical model. On the contrary, when only the diagnosis with the mathematical model determines the state as "abnormal," there is a possibility that the mathematical model has learnt a feature quantity unknown to the human and detects the abnormality in a level and a mode that the human is less likely to notice.

Therefore, when the determination with the physical model is "abnormal" and the determination with the mathematical model is "normal" at S4, the determination of necessity of the mathematical model update is performed. In the opposite case, the determination of necessity of the physical model update is performed. When the diagnoses by both match, the model update is not necessary.

While the above-described example describes the system that extracts and detects the characteristics during "abnormal," in the case where the characteristics during "normal" are extracted and detected, the system behaves the opposite of the above-described example. Whether the model is any of "the abnormal detection model" or "the normal detection model" is set to the model update condition setting means 16 and performance at S4 can be switched.

Figure 4:
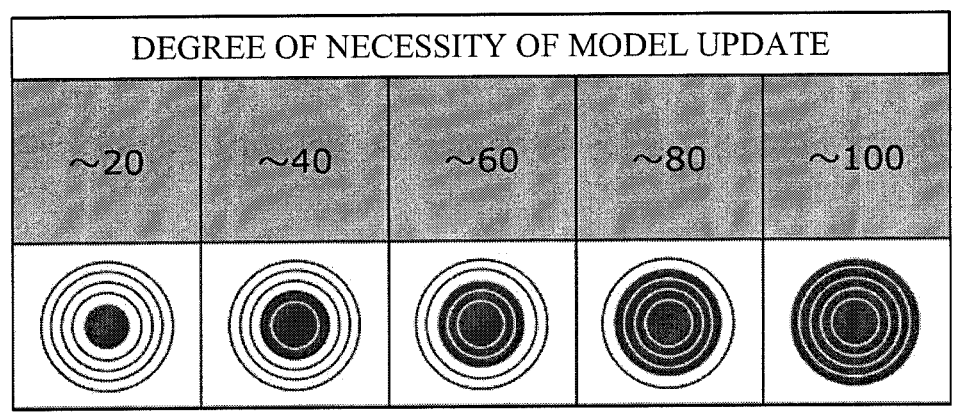
FIG. 4 is an explanatory view of a model update recommendation display.

Next, the following describes details of the model update recommendation notification at S7 with reference to FIG. 4. As described above, when the diagnostic results with the physical model and the mathematical model are mismatched, the necessity of the model update is displayed at S4. However, depending on a labor taken for the update, a schedule of the machine, or a similar situation, the update work may not be instantly performed in some cases. In such a case, by displaying the magnitude of the necessity of update together, the magnitude can be used as a reference to plan a work project. For example, like FIG. 4, icons may be used, and a device such as changing filled regions according to the level of the degree of necessity may be taken. Changing colors of the icons, for example, blue for during normal, red for during abnormal, and yellow for during which the model update is necessary, ensures further clear notification.

The degree of necessity of update can be expressed by, for example, the following formula (1) using the certainty factors of the physical model and the mathematical model.

Degree of necessity of update=min (mathematical model certainty factor, physical model certainty factor)  Formula (1)

Alternatively, the certainty factor of the mathematical model may be used for the "abnormal" determination with the physical model, and the certainty factor of the physical model may be used for the "abnormal" determination with the mathematical model. As a method for obtaining the certainty factors, for example, a degree of discrepancy from the threshold can be used for the physical model, and a unit output value from a neural network output layer can be used for the mathematical model. The intention of these formulae is that "a misdiagnosis with certainty" increases the necessity of the model update. As long as the intension of the operation is similar, the formulae of the embodiment are not limited to the above-described formulae.

Next, the following describes the storage of the information required to update the physical model at S6 in detail.

As described above, when only the diagnosis with the mathematical model determines the state as "abnormal," there is a possibility that the mathematical model can extract the feature of the abnormality that the human is less likely to notice. Therefore, collecting and analyzing such cases ensures the establishment of the physical model that handles new feature quantities and abnormal forms. However, if a large amount of data is indiscriminately collected, the analysis cannot follow, and further, utilizing the data is possibly failed. Therefore, classifying and collecting the data according to the pattern allows educating the model more efficiently.

Figure 5:
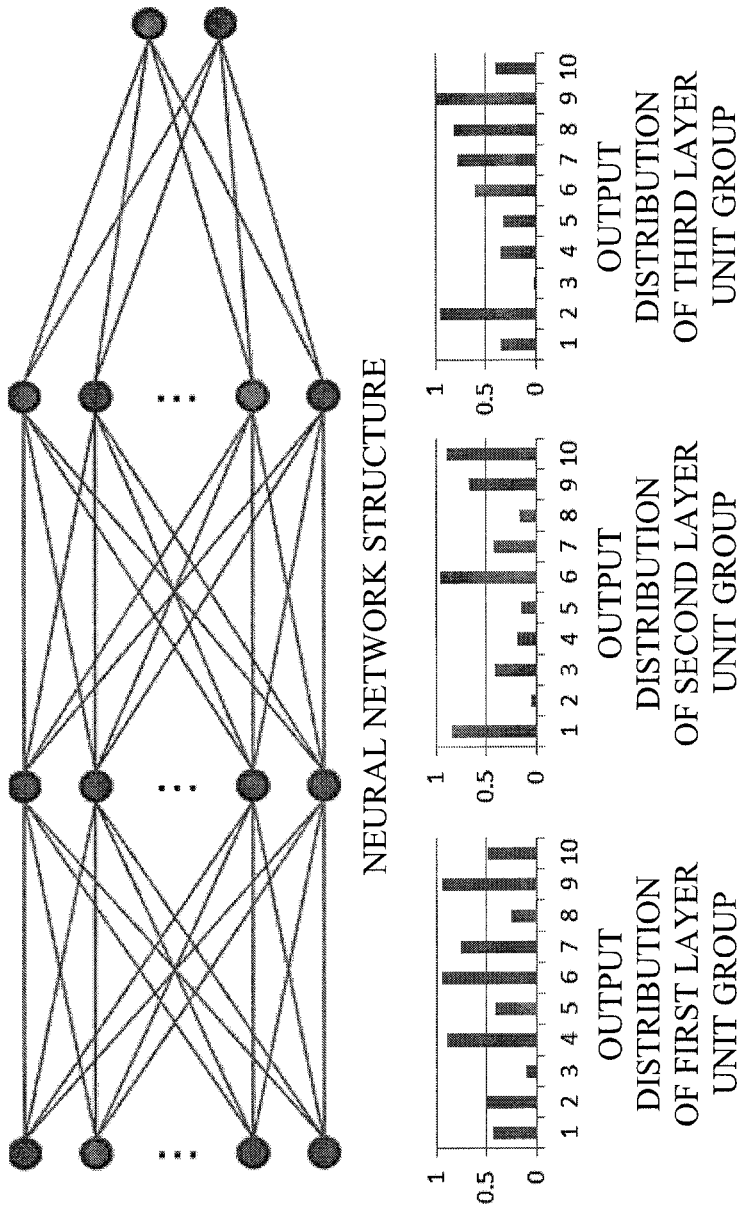
FIG. 5 is an explanatory view illustrating a neural network structure and output distributions of respective layer unit groups.

The following describes the machine learning using the neural network as the example. In a process that the neural network determines the state as "abnormal" (or "normal"), firing of respective neurons constituting the network propagates and generates a final output value. Therefore, the accumulation of the diagnostic information associating with the firing patterns of the respective neurons as illustrated in FIG. 5 allows obtaining data classifications corresponding to the identical abnormal modes. The analysis of data according to the classification allows advancing the establishment of the new physical model more efficiently.

To achieve the above-described configuration, at S6, the operation information of the mathematical model (for example, the firing patterns of the neural networks) in addition to the diagnostic information is stored together. This ensures contribution to the efficient physical model development. For example, patterns mutually having a high correlation are determined to be in the identical class when the output distributions of the respective units are observed in the form of waveforms, and thus the classification method by the firing pattern can be appropriately selected.

Thus, the diagnostic device 10 with the above-described configuration includes the physical model base diagnosis means 14, the mathematical model base diagnosis means 15, the model update necessity determination means 17, and the display means 19. The physical model base diagnosis means 14 calculates the feature quantity predicted to be generated when the abnormality occurs in the machine tool 1 using the diagnostic information acquired from the diagnostic information acquisition means 11 and the physical model data acquired from the physical model storage means 12 and performs the diagnosis using this feature quantity. The mathematical model base diagnosis means 15 performs the diagnosis using the machine learning model that has learnt based on the mathematical model data acquired from the mathematical model storage means 13 based on the signals during normal and/or abnormal of the machine tool 1 acquired from the diagnostic information acquisition means 11. The model update necessity determination means 17 determines that at least one of the physical model or the mathematical model is necessary to be updated if the diagnostic results by the physical model base diagnosis means 14 and the mathematical model base diagnosis means 15 differ. The display means 19 notifies the necessity of the update when the model update necessity determination means 17 determines that the update is necessary. Accordingly, for example, the device itself can measure the appropriate update timing for the diagnostic model, the diagnostic device 10 can internally perform the learning again automatically, and the necessity of the update of the model can be notified to the manufacturer. Therefore, preferred diagnostic ability can always be maintained.

Especially, the diagnostic information storage means 18, which stores the information required for the diagnosis with the physical model and/or the mathematical model when the model update necessity determination means 17 determines that the update is necessary, is provided here. Therefore, the information required to update the diagnostic model can be efficiently collected and held, thereby ensuring a reduction in an amount of memory and a volume of communications and improvement in the diagnosis performance.

Additionally, since the display means 19 displays the necessity of the model update in the screen and also displays the level of the degree of necessity of update. Therefore, the information required for examination whether the update is actually performed or not and the schedule adjustment for the update work can be easily obtained.

The configuration of this diagnostic device is not limited to the above-described configuration, for example, in the case where the data storage device has the sufficient room for capacity, a configuration that standardizes S5 and S6 and stores all information held by the system may be employed.

The diagnostic object is not limited to the machine state diagnosis and is also applicable to a diagnosis of a processing state or a similar diagnosis.

Furthermore, in the case where an end user is made unaware of "model update" in the operation of this diagnostic device, the information may be indicative of a lack of the model such as "the model is incompatible" instead of the update notification.

While in the embodiment, the technician examines and establishes the physical model, the similar effect can be obtained by using the mathematical model obtained, for example, through the following learnings as a discriminator equivalent to the physical model. With the intention of high-accurate detection of the specific abnormal mode, the mathematical model is caused to learn by limiting the input signal for each abnormal mode or assigning a detailed label for each abnormal mode focusing on the physical causal relationship. Alternatively, the mathematical model is caused to learn using teacher data putting emphasis on a measurement data group corresponding to the target abnormal mode. In this case, by mutually complementing the mathematical model equivalent to the physical model, which aims to highly accurately detect the specific abnormal mode, and the mathematical model, which aims to widely detect the abnormality, the effect intended by this embodiment can be achieved.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A diagnostic device that diagnoses a state of a test object, comprising:
    a physical model base diagnosis unit configured to perform the diagnosis using a feature quantity, generating a first diagnostic result, the feature quantity being predicted to be generated when an abnormality occurs in the test object based on a physical characteristic of the test object;
    a mathematical model base diagnosis unit configured to perform the diagnosis using a machine learning model, generating a second diagnostic result that is independent of the first diagnostic result, the machine learning model having learnt based on at least one of a signal while the test object is normal and a signal while the test object is abnormal;
    a model update necessity determination unit configured such that if the first diagnostic result and the second diagnostic result differ, the model update necessity determination unit determines that at least one of a physical model or a mathematical model is necessary to be updated; and
    an update notification unit configured such that if the model update necessity determination unit determines that the update is necessary, the update notification unit notifies that the update is necessary.

2. The diagnostic device according to claim 1, wherein the physical model base diagnosis unit includes:
    a diagnostic information acquisition unit configured to acquire information for the state diagnosis from the test object; and
    a physical model storage unit that stores the physical model, the physical model being configured to calculate the feature quantity based on the physical characteristic of the test object, the feature quantity being generated in diagnostic information acquired by the diagnostic information acquisition unit when the abnormality occurs.

3. The diagnostic device according to claim 1, wherein the mathematical model base diagnosis unit includes:
    a diagnostic information acquisition unit configured to acquire information for the state diagnosis from the test object; and
    a mathematical model storage unit that stores the mathematical model obtained through the machine learning based on the diagnostic information, at least one of the diagnostic information being acquired by the diagnostic information acquisition unit while the test object is normal and the diagnostic information being acquired by the diagnostic information acquisition unit while the test object is abnormal.

4. The diagnostic device according to claim 1, further comprising:
    a model update condition setting unit configured to set which state of normal or abnormal of diagnositic result of the test object necessitates the update of a model, wherein
    the model update necessity determination unit is configured to determine that the model, where the diagnostice result of the state of the test object matches a condition set to the model update condition setting unit, needs to be updated.

5. The diagnostic device according to claim 1, further comprising
    a diagnostic information storage unit configured such that if the model update necessity determination unit determines that the update is necessary, the diagnostic information storage unit stores information required for the diagnosis with at least one of the physical model and the mathematical model.

6. The diagnostic device according to claim 5, wherein:
    a neural network is employed as the machine learning model, and
    the diagnostic information storage unit is configured to classify and store the information required for the diagnosis with the physical model based on an output distribution of respective neurons constituting the neural network.

7. The diagnostic device according to claim 1, wherein the update notification unit is configured to display necessity of the update of the model in a screen, the update notification unit being configured to display a level of a degree of necessity of the update together.

* * * * *